Nov. 18, 1958  R. W. WILSON ET AL  2,860,800
TRAILER
Filed May 3, 1956  3 Sheets-Sheet 1

INVENTORS
Rufus W. Wilson &
John C. Horn.
BY Karl W. Flocks
ATTORNEY

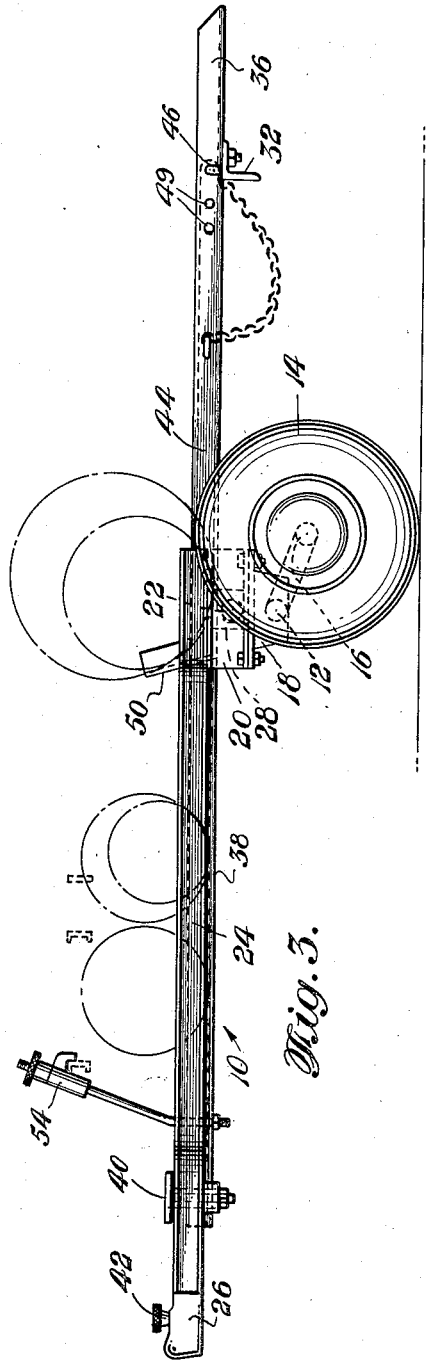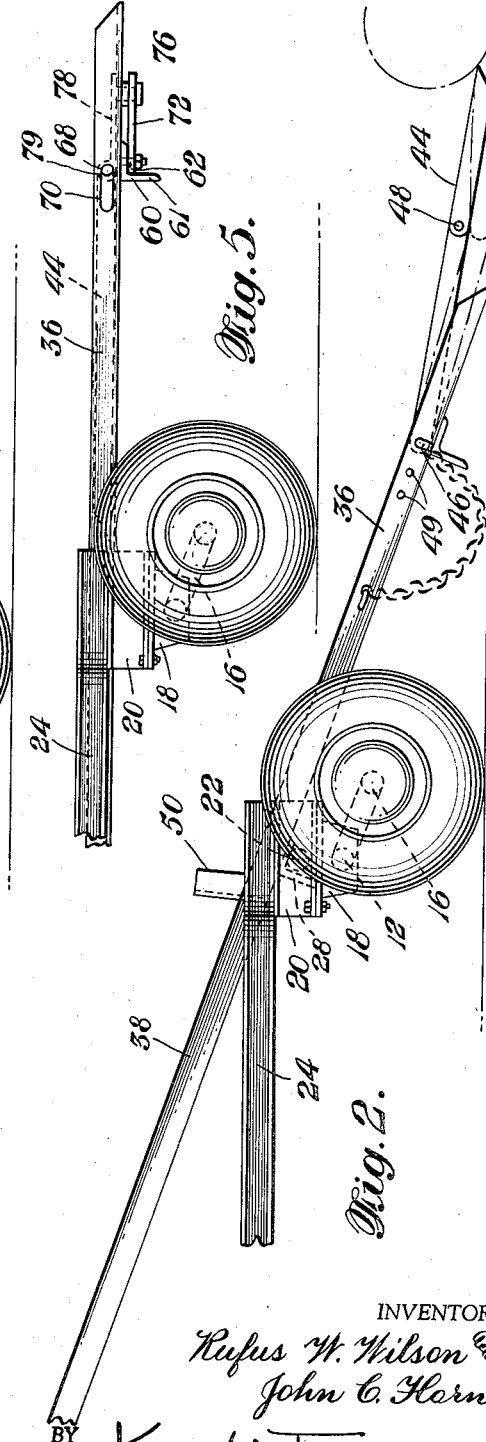

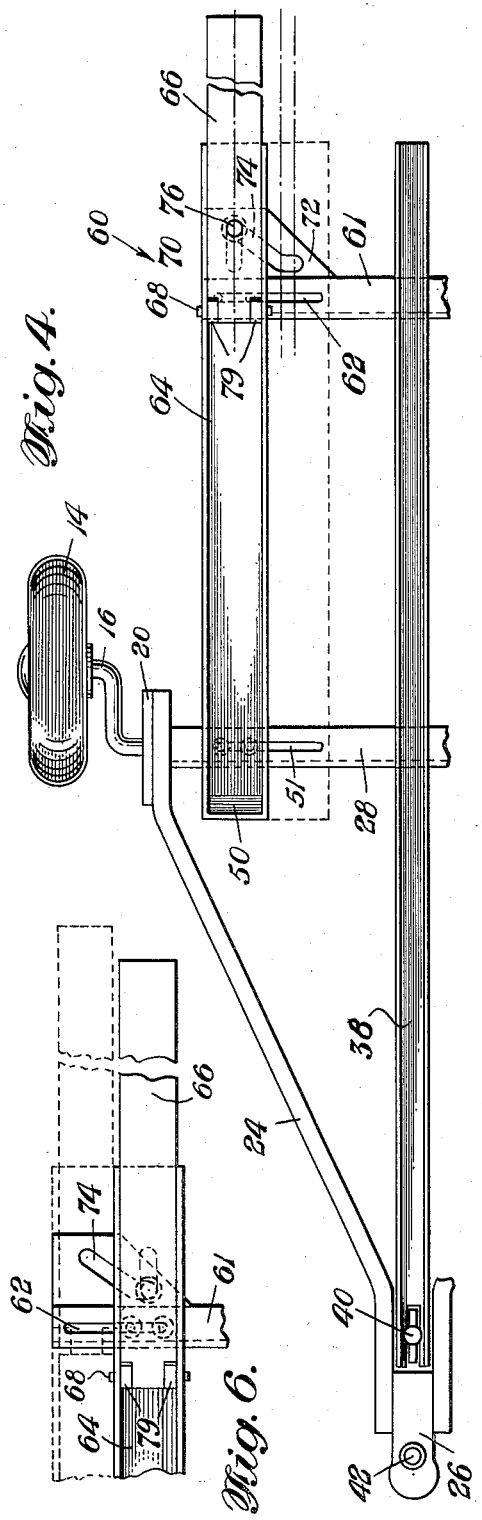

United States Patent Office 2,860,800
Patented Nov. 18, 1958

2,860,800

TRAILER

Rufus W. Wilson, Huntingdon, and John C. Horn, Alexandria, Pa., assignors to Wald Industries, Inc., Huntingdon, Pa., a corporation of Pennsylvania Application May 3, 1956, Serial No. 582,453

10 Claims. (Cl. 214—506)

The present invention relates to trailers for transporting vehicles thereon. More particularly, the present invention relates to a trailer that is adjustable to accommodate thereon land vehicles of varying wheel gauges.

A problem attendant with the use of small self-propelled vehicles such as road striping machines is to transport these vehicles to the different job sites. Since the machines are not capable of being driven for great distances under their own power, some form of transportation is usually provided for the vehicle.

Prior to the instant invention, trailers of the tow variety have been employed for this purpose and although these heretofore known trailers have been satisfactory for use with a specific machine, they were not acceptable for use with various size machines. Thus, the prior known trailer could only accommodate a machine having a specific wheel gauge and was not able to receive thereon a wheeled vehicle having a different wheel gauge than that for which the trailer was designed.

It is therefore an object of the present invention to provide a trailer for accommodating small land vehicles of various wheel gauges.

Another object of the present invention is to provide a trailer that is adjustable to provide for various size vehicles.

Still another object of the present invention is to provide a tow trailer that is formed with laterally adjustable trackways for accommodating various size vehicles thereon.

Still another object of the present invention is to provide a trailer for small land vehicles which includes an adjustable chock for securing the vehicle in position on the trailer.

Still another object of the present invention is to provide a combination ramp and chock device for a tow trailer, the ramp and chock device being adapted to secure various size wheels in position on said trailer.

Other objects and the nature and advantages of the instant invention will be apparent from the following description taken in conjunction with the accompanying drawings, wherein:

Fig. 2 is a side elevational view of the trailer shown in Fig. 1 being located in the position for receiving a vehicle therein;

Fig. 3 is a side elevational view similar to Fig. 2, showing the position of the trailer when it is loaded with a vehicle thereon;

Fig. 4 is a top plan view of the trailer embodied in the present invention showing a combination adjustable ramp-chock device;

Fig. 5 is a side elevational view of the trailer illustrated in Fig. 4 showing the ramp-chock adjusting device;

Fig. 6 is an enlarged view of the ramp-chock adjusting device shown in Fig. 4; and Fig. 7 is a top plan view of a modified form of an adjustable trailer.

Figure 1:
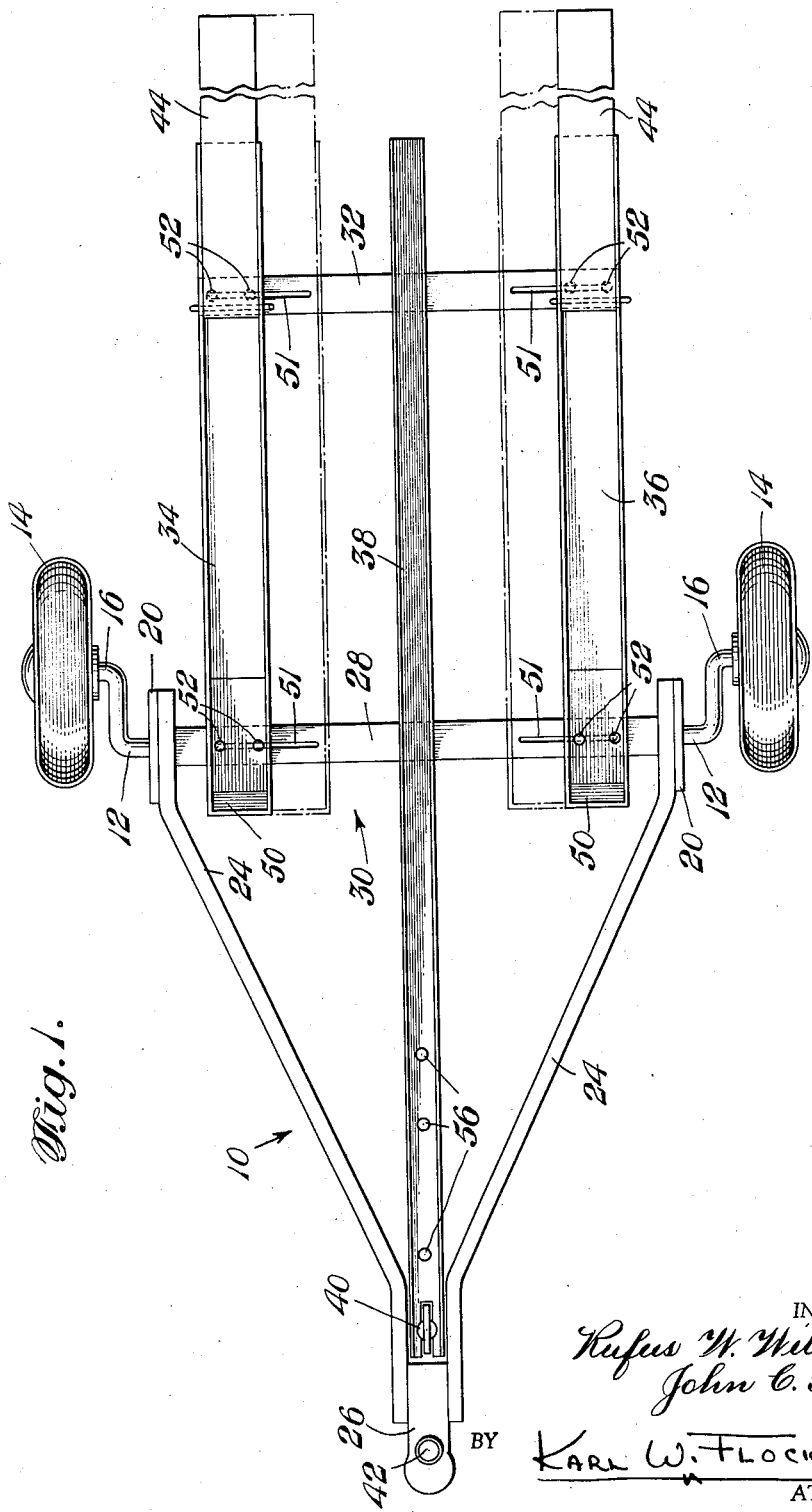
Fig. 1 is a top plan view of one form of the adjustable tow trailer embodied in the present invention.

Referring now to the drawings, and particularly Figs. 1-3, one form of the invention embodied herein is illustrated and comprises a trailer generally indicated at 10. The trailer 10 is of the tow-type and is designed specifically to carry small three-wheeled self-propelled vehicles such as road striping or marking machines. The trailer 10 includes an axle 12 that is formed in a "U" configuration, the central portion of the axle 12 being eccentrically disposed with respect to the axis of wheels 14. The wheels 14 are journalled for rotation in suitable bearings which are mounted on the outermost end of spindles 16, the spindles 16 being formed integral with the offset axle 12. In order to transport the trailer 10 at relatively high speeds on highways, the wheels 14 are provided with conventional pneumatic tires.

As shown in Figs. 2 and 3, the offset axle 12 extends through a pair of bearing blocks 18 which are spaced apart and positioned adjacent the wheels 14. The bearing blocks 18 are free to pivot with respect to the axle 12 and have mounted thereon channel-shaped supports 20. Each of the supports 20 is provided with a central opening for receiving a stub shaft 22 (Figs. 2 and 3), the stub shafts 22 being free to pivot with respect to the supports 20. Mounted on each of the supports 20 and secured thereto by welding or the like are support members 24. The support members 24 extend forwardly of the axle 12 and have a tongue 26 secured to the outermost end thereof, the support members 24 and tongue 26 defining a yoke construction.

Secured to the stub shafts 22 and rotatable therewith is a lateral strut 28 that is formed as part of a pivotally mounted platform assembly, generally indicated at 30. The platform assembly 30 further includes a lateral strut 32 that is spaced from the strut 28 and is parallel therewith, the struts 28 and 32 having adjustably mounted thereon a pair of spaced channel members 34, 36 that define trackways for receiving the outer wheels of the three-wheeled vehicle to be carried by the trailer. Permanently secured to the struts 28 and 32 and positioned centrally of the trackways 34, 36 is a central trackway 38 that is adapted to receive the middle wheel of the three-wheeled vehicle. Since the vehicle carried by the trailer 10 is normally located with the front wheel thereof considerably forwardly of the axle 12, the central trackway extends forwardly of the trackways 34, 36, the outermost end thereof being adapted to be received between the outer end of the support members 24.

As seen in Fig. 1, the outer end of the central trackway 38 is slotted and is adapted to receive a lock nut 40 therein for locking the platform assembly in the loaded position. The lock nut 40 which is mounted on a plate connected to the support members 24 is thus projected through the outer slot in the trackway 38 and then twisted 90° to lock the central trackway to the support members 24 and tongue 26. It is seen that the tongue 26 and support members 24 thus define a drawbar and the tongue 26 is provided with a convenient ball and hitch socket 42 for facilitating attaching the trailer 10 to a towing vehicle.

In order to facilitate loading of the three-wheeled vehicle on the platform assembly 30, guide ramps 44 are provided and are pivotally connected to the trackways 34, 36. As shown in Fig. 1 and Fig. 2, the guide ramps 44 are positioned within the channel-shaped trackways and extend rearwardly therefrom to form an approach of a lesser angle than the trackways. The vehicle is thus able to be more easily guided into position on the platform assembly. The guide ramps are also adapted to serve as chocks for the vehicle wheels in the loaded position and for this purpose are pivotally secured to the trackways at 46 as seen in Fig. 2. The ramps 44 are also pivoted at an intermediate portion 48, thus enabling the outer end of the ramps 44 to slide into engagement with the vehicle wheel after the vehicle has been positioned on the platform assembly. In order to adjust the ramps 44 for smaller diameter wheels, when the ramps are serving as chocks, several openings 49 are provided in the trackway walls, the openings 49 thereby providing means for enabling the ramps 44 to be moved closer to the front end of the platform assembly. The ramps 44 cooperate with vertical stops 50 formed integral with the trackways 34, 36 to retain the vehicle in position. Thus, the vehicle is rolled onto the platform assembly 30, the outer wheels thereof moving forwardly until the vertical stops 50 are reached. The ramps are then pivoted forwardly and moved into chock position, whereby they contact the rear of the outer wheels and thus act to firmly lock the vehicle on the platform assembly.

The platform assembly 30 is also adapted to compensate for various wheel gauge vehicles and for this purpose the trackways 34, 36 are laterally adjustable. As seen in Fig. 1, the struts 28 and 32 are provided with slots 51 through which extend bolts 52. The trackways are thus locked to the struts 28, 32 by securing convenient nuts on the bolts on the underside of the struts. If a vehicle of a different wheel gauge than formerly carried by the trailer is to be transported, the bolts 52 are loosened and the trackways 34, 36 adjusted to the proper spacing. As shown in dotted lines in Fig. 1, the trackways 34 have been moved inwardly to provide for a narrow gauge vehicle.

In operation, prior to loading the three-wheeled vehicle onto the platform assembly, the draw bar must be connected to the towing vehicle. Normally, the tongue 26 will be resting on the ground in the unloaded position. The tongue 26 and support members 24 are then lifted to a horizontal position pivoting on the axle 12 through the channel supports 20 and bearing blocks 18. The tongue 26 is then secured to the rear of the towing vehicle by the ball and hitch socket 42. At this time, the platform assembly 30 is still in the inclined position since the distribution of weight of the trackways 34, 36 overbalances the platform assembly so that it maintains the inclined position shown in Fig. 2. The ramps 44 are pivoted to the position shown in Fig. 2 and the three-wheeled vehicle, which is normally self-propelled, is moved over the ramps and onto the platform assembly, the outer wheels of the vehicle riding in the trackways 34, 36 and the middle wheel of the vehicle riding in the trackway 38. When the vehicle rear wheels reach the vertical stops 40, the weight of the vehicle overbalances the platform assembly which pivots like a see-saw and the outer end of the central trackway 38 then moves downwardly to contact the supports 24. The central trackway is then locked to the support members 24 by the lock bolt 40 and the vehicle assumes the position shown in Fig. 3. In order to firmly secure the vehicle in place on the platform assembly, a hook assembly 54 is provided and is adapted to engage the frame of the vehicle. Openings 56 (Fig. 1) are formed in the central trackway 38 and provide for adjustment of position of the hook assembly 54 in accordance with the length of the vehicle being carried. As shown in dotted lines in Fig. 3, three different size vehicle wheels *a*, *b* and *c*, are shown in the position they would normally occupy on the platform assembly 30. It is understood that the trackways 34 and 36 are adjusted laterally to accommodate for the various wheel gauges of the vehicles *a*, *b* and *c* when one of these particular vehicles is to be transported by the trailer 10.

Referring now to Figs. 4–6, a modified form of the invention is illustrated and includes substantially the same structure described above in connection with Figs. 1–3. The modification shown in Figs. 4–6 is directed toward an adjusting mechanism for the trackway and particularly to a ramp-chock device indicated generally at 60. The structure in Figs. 4–6 includes a lateral strut 61 that is provided with a slot 62 and an outer trackway 64 similar to trackway 34 is secured to the strut 61, being located in parallel relation to the strut 28. Positioned in the channel of the trackway 64 is a ramp-chock 66 that is pivotally secured to the side wall of the trackway by a pin 68. As seen in Fig. 5, a slot 70 is formed in the side walls of the trackway and receives the pin 68 therein and thereby provides for limited movement of the ramp-chock 66. Secured directly to the underside of the strut 61 is a cam plate 72 that has a cam slot 74 formed therein. Extending into the cam slot 74 is a pin 76 that is secured to a plate 78, the plate 78 including forwardly extending ears 79. The pin 68 extends through the ears 79, the plate 78, and through the forward extension of the ramp-chock 66 to secure the plate 78 to the ramp-chock 66. It is seen that when a vehicle having a wheel gauge different than that for which the platform assembly is adjusted is to be carried by the trailer, it is only necessary to loosen the lock bolts that secure the struts 28 and 60 to the trackway 64. As the trackway 64 is moved laterally, the pin 76 is forced to follow the cam slot 74 and move the ramp-chock 66 in a forwardly or rearwardly direction, depending on the movement of the trackway 64. Thus, when the trackway 64 is moved inwardly to accommodate a narrow gauge vehicle, the ramp-chock 66 is moved forwardly so that when the vehicle is in position on the platform assembly, the ramp-chock 66 is pivoted from the ramp position to the chock position and properly contacts the rear edge of the vehicle rear wheel. Conversely, when the trackway 64 is moved outwardly, the ramp-chock 66 is forced to move rearwardly.

Referring now to Fig. 7, a further modified form of the present invention is illustrated and includes a construction similar to that shown in Figs. 4–6. In addition, a manual control is provided for controlling the lateral movement of the trackways. The trackway lateral adjustment control includes an elongated rod 80 that is formed with opposite threads on the extreme ends thereof. Each of the threaded ends of the rod 80 extends into a housing 82 that is provided with a nut 84 for receiving the threaded end of the rod therein. A manual control or handle 86 engages the rod 80 and provides for rotation thereof. It is seen as the handle 86 is rotated, the rod 80 will rotate and thereby cause the nut and the trackway 88 on which the nut is mounted to translate. The direction of movement of the trackway 88 will be determined by the direction of rotation of the handle 86. The ramp-chock adjusting device 61 shown in Figs. 4–6 may also be employed in the construction shown in Fig. 7, the lateral adjustment of trackway 88 automatically adjusting the position of the ramp-chock 66.

The trailer embodied in the present invention provides a convenient and simple apparatus for loading and unloading three-wheeled vehicles and for transporting these vehicles from one job site to another. Since the outer trackways of the platform assembly may be adjusted laterally, the trailer is not limited for use with any particular vehicle. The ramp-chock device not only provides for easy loading and unloading of the vehicle, but, in addition, acts to securely mount the vehicle on the platform assembly. By providing an interrelation of adjustment for the trackways, with the ramp-chock device, adjustment of the trackways to accommodate various size vehicles will also adjust the position of the ramp-chock device in accordance with the vehicle being carried.

It will be obvious to those skilled in the art that various changes may be made without departing from the spirit of the invention and therefore the invention is not limited to what is shown in the drawings and described in the specification but only as indicated in the appended claims.

What is claimed is:

1. In a trailer for transporting wheeled vehicles thereon, an axle having wheels mounted for rotation thereon, a platform assembly pivotally mounted over said axle, said platform assembly including spaced trackways, struts interconnecting said trackways, said struts having slots formed therein providing for lateral adjustment of said trackways, and a ramp-chock device secured to each of said trackways, said ramp-chock device being positioned initially for aiding in loading said vehicle on said platform assembly and being moved to a second position in engagement with the wheels of said vehicle thereby aiding in retaining said vehicle on said platform assembly.

2. In a trailer as set forth in claim 1, wherein means mounted on said platform assembly are provided for laterally adjusting the position of said trackways.

3. In a trailer as set forth in claim 1 which further includes cam means engaging said trackways, said cam means being interconnected with said ramp-chock device to cause longitudinal movement thereof upon lateral movement of said trackways.

4. In a trailer as set forth in claim 1, wherein said ramp-chock devices are pivoted intermediate the ends thereof, the pivoted connection aiding in sliding said devices into engaging relation with the wheels of said vehicle when said vehicle is located in the loaded position on said platform assembly.

5. In a trailer for transporting three-wheeled vehicles, an axle having wheels mounted for rotation thereon, a draw bar operatively connected to said axle and extending forwardly thereof, a platform assembly pivotally mounted over said axle, said platform assembly including spaced outer trackways and a central trackway disposed between said outer trackways, lateral struts interconnecting said trackways, means securing said struts to said trackways and providing for lateral adjustment thereof, and means engaging the ends of said trackways to provide for retaining of said vehicle on said platform assembly, said engaging means and said securing means being interconnected whereby movement of said trackways in a lateral direction causes movement of said engaging means in a longitudinal direction.

6. In a trailer for transporting wheeled vehicles thereon, an axle having wheels mounted for rotation thereon, a platform assembly pivotally mounted over said axle, said platform assembly including spaced trackways, lateral struts interconnecting said trackways, means adjustably securing said struts to said trackways, said adjustable securing means including slots formed in said struts and bolts extending through said trackways into said slots, and ramp means secured to the ends of said trackways for aiding in mounting the vehicles on said platform assembly, said ramp means being pivotally mounted on said trackways and movable with respect to said trackways after said vehicle is loaded thereon in engagement with the wheel of the vehicle to act as a chock therefor.

7. In a trailer for transporting wheeled vehicles thereon, an axle having wheels mounted for rotation thereon, a platform assembly pivotally mounted over said axle, said platform assembly including spaced trackways, lateral struts interconnecting said trackways, means adjustably securing said struts to said trackways, said adjustable securing means including slots formed in said struts and bolts extending through said trackways and into said slots, and ramp means secured to the ends of said trackways for aiding in mounting the vehicle on said platform assembly, said ramp means being movable to a stop position and being longitudinally adjustable to compensate for different size vehicles.

8. In a trailer as set forth in claim 7, which includes means for interconnecting said adjustable trackways and said ramp means so that lateral adjustment of said trackways causes said ramp means to be adjusted longitudinally.

9. In a trailer for transporting a wheeled vehicle thereon, an axle having wheels mounted for rotation thereon, a platform assembly pivotally mounted over said axle, said platform assembly including spaced trackways, lateral struts engaging said trackways, means interconnecting said lateral struts with said trackways and providing for lateral adjustment thereof, and means operatively connected to said trackways for guiding said vehicle thereon, said guiding means including pivotally mounted members that define a ramp during the loading operation and are pivotally moved to engage the wheels of said vehicle to act as a chock therefor after said vehicle is moved onto said trackways.

10. In a trailer in accordance with claim 9 wherein said vehicle is of the character that has relatively little road clearance, and said trackways are inclined rearwardly in the loading position to define a relatively sharp slope, said pivotally mounted members extending substantially rearwardly beyond the rearmost end of said trackways to engage the surface upon which said trailer is located and to form an inclined track of relatively little slope, said inclined track of relatively little slope enabling said vehicle of relatively little road clearance to be loaded onto said sharply inclined trackways without the body of said vehicle contacting said surface.

References Cited in the file of this patent

UNITED STATES PATENTS

| | | |
|---|---|---|
| 1,387,163 | Munzlinger | Aug. 9, 1921 |
| 2,168,624 | Musgrave | Aug. 8, 1939 |
| 2,248,080 | Hathaway | July 8, 1941 |
| 2,391,503 | Page | Dec. 25, 1945 |
| 2,491,044 | Holland | Dec. 13, 1949 |
| 2,628,733 | Hale | Feb. 17, 1953 |
| 2,661,108 | Horn et al. | Dec. 1, 1953 |
| 2,727,638 | Sestan | Dec. 20, 1955 |

FOREIGN PATENTS

| | | |
|---|---|---|
| 534,578 | Great Britain | Mar. 11, 1941 |